(12) United States Patent
Yamada (10) Patent No.: US 7,545,708 B2
(45) Date of Patent: Jun. 9, 2009

(54) OBJECTIVE LENS HOLDER FOR AN OBJECTIVE LENS DRIVING DEVICE CAPABLE OF THINNING AN OPTICAL PICKUP UNIT

(75) Inventor: Tsukasa Yamada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 687 days.

(21) Appl. No.: 11/158,717

(22) Filed: Jun. 22, 2005

(65) Prior Publication Data
US 2006/0077782 A1  Apr. 13, 2006

(30) Foreign Application Priority Data
Aug. 30, 2004  (JP) .............................. 2004-250543

(51) Int. Cl.
*G11B 7/00* (2006.01)
(52) U.S. Cl. ................................ 369/44.14; 369/44.16
(58) Field of Classification Search ................ 369/44.16
See application file for complete search history.

(56) References Cited

U.S. PATENT DOCUMENTS

| 5,555,623 | A * | 9/1996 | Goda ........................ 29/896.9 |
| 7,292,508 | B2 * | 11/2007 | Nogami et al. ........... 369/44.16 |
| 2003/0156529 | A1 | 8/2003 | Tajiri | |
| 2004/0177365 | A1 | 9/2004 | Takeshita et al. | |
| 2004/0240335 | A1 * | 12/2004 | Cho et al. ................. 369/44.15 |
| 2004/0268373 | A1 * | 12/2004 | Song et al. .................... 720/683 |
| 2005/0041540 | A1 * | 2/2005 | Tanaka ..................... 369/44.15 |
| 2005/0281144 | A1 * | 12/2005 | Katou et al. ............. 369/44.14 |
| 2006/0239137 | A1 | 10/2006 | Kim et al. | |

FOREIGN PATENT DOCUMENTS

| EP | 1 717 800 A2 | 11/2006 |
| JP | 61-087229 A | 5/1986 |
| JP | 11-149652 A | 6/1999 |
| JP | 2001-093177 A | 4/2001 |
| JP | 2001-273656 A | 10/2001 |
| JP | 2001-284740 A | 10/2001 |
| JP | 2002-288870 A | 10/2002 |
| JP | 2003-272220 A | 9/2003 |

\* cited by examiner

*Primary Examiner*—Wayne R Young
*Assistant Examiner*—Lixi Chow
(74) *Attorney, Agent, or Firm*—Frishauf, Holtz, Goodman & Chick, P.C.

(57) ABSTRACT

An objective lens holder for use in an objective lens driving device of a symmetry type has an upper member and a lower member assembled with the lower member. The lower member has a pair of main bobbin portions for winding two tilting coils and two focusing coils. The pair of main bobbin portion is symmetrically disposed with respect to an optical axis of a laser beam. The upper member and the lower member have openings for passing through the laser beam. Each of the upper member and the lower member has four hook portions for winding four tracking coils.

14 Claims, 7 Drawing Sheets

OBJECTIVE LENS HOLDER FOR AN OBJECTIVE LENS DRIVING DEVICE CAPABLE OF THINNING AN OPTICAL PICKUP UNIT

This application claims priority to prior Japanese patent application JP 2004-250643, the disclosure of which is incorporated herein by reference.

BACKGROUND OF THE INVENTION

This invention relates to an objective lens driving device suitable for use in an optical pickup unit of an optical disc drive and, in particular, to an objective lens holder for use in the objective lens driving device.

As well know in the art, an optical disc drive is a device for reading/writing information from/into an optical disc (CD, CD-ROM, CD-R/RW, DVD-ROM, DVD±R/RW, Blu-lay, HD DVD, or the like). In order to achieve reading/writing the information from/into the optical disc, the optical disc drive of this type comprises an optical pickup unit for irradiating a laser beam onto the optical disc and for detecting its reflected beam.

In the manner which is well known in the art, in DVD apparatuses, there is one in which a particular optical pickup unit is mounted in order to enable to record/reproduce data in/from both of the DVD and the CD. The particular optical pickup unit of the type is for carrying out recording or reproducing by selectively using two kinds of laser beams, namely, a laser beam having short wavelength (wavelength band of 650 nm) for the DVD and a laser beam having a long wavelength (wavelength band of 780 nm) for the CD. The particular optical pickup unit is called a two-wavelength handling optical pickup unit.

One of the two-wavelength handling optical pickup units of the type described comprises a first laser diode (LD) for emitting the laser beam (a first laser beam) having the short wavelength for the DVD and a second laser diode (LD) for emitting the laser beam (a second laser beam) having the long wavelength for the CD. Such a two-wavelength handling optical pickup unit is disclosed in Japanese Unexamined Patent Application Publication No. 2003-272220 or JP-A 2003-272220.

However, if the first laser diode and the second laser diode are formed as separate parts, it is inconvenient that the two-wavelength handling optical pickup unit comprises a lot of parts and is large-scale. In order to cope with such problems, a new laser diode comprising, as one part (one chip), the first laser diode and the second laser diode is developed and proposed, for example, in Japanese Unexamined Patent Application Publication No. 11-149652 or JP-A 11-149652. Such a new laser diode is called a one-chip type laser diode. It is possible to miniaturize the two-wavelength handling optical pickup unit by using the one-chip type laser diode.

However, inasmuch as the one-chip type laser diode has a first emission point for emitting the first laser beam and a second emission point for the second laser beam that are apart from each other by a predetermined distance of, for example, 100 μm, the first laser beam and the second laser beam are emitted in parallel with they apart from each other by the predetermined distance. Accordingly, various problems can arise when one of two laser beams apart from each other is irradiated on the optical disc. It is therefore preferable to guide the first laser beam and the second laser beam to the same optical axis by using any optical axis coinciding means.

A two-wavelength laser module solving such a problem is proposed, for example, in Japanese Unexamined PatentApplication Publication No. 2001-284740 or JP-A 2001-284740. The proposed two-wavelength laser module comprises a first laser source for emitting a first laser beam having a first wavelength, a second laser source for emitting a second laser beam having a second wavelength different from the first wavelength, and optical axis coinciding means for receiving one of the first laser beam and the second laser beam to emit a laser beam on the same optical axis. In the two-wavelength laser module, the first laser source, the second laser source, and the optical axis coinciding means are mounted in a package.

In addition, in the above-mentioned one-chip type laser diode, when the two laser beams apart from each other are irradiated on the optical disc, return beams reflected thereon (disc's reflected beams) are also reflected (returned) with optical axes of them deviated from each other. Accordingly, in this state as it is, it is impossible to receive the disc's reflected beams at one reception position in a photodetector.

An optical pickup unit solving this problem is also proposed, for example, in Japanese Unexamined PatentApplication Publication No. 2002-288870 or JP-A 2002-288870. The proposed optical pickup unit comprises a two-wavelength package laser diode, an optical system, and an optical axis combining element. The two-wavelength package laser diode emits first and second laser beams, which have first and second wavelengths different from each other, in parallel from first and second emission points apart from each other by a predetermined distance, respectively. The optical system is for guiding the first and the second laser beams to an optical disc and is for transmitting first and second return beams having deviated optical axes incident from the optical disc. The optical axis combining element guides the first and the second return beams transmitted through the optical system to the photodetector so that the deviated optical axes are coincided at one reception position of the photodetector.

At any rate, the optical disc drive of the type described develops a tendency to a thin type (a slim type or a ultra-slim type) so as to have a low height size. As a result, it is necessary to thin an optical pickup actuator which is a main portion of the optical pickup unit.

In general, an optical pickup unit comprises a laser beam source for emitting a laser beam and an optical system for guiding the emitted laser beam to an optical disc and for guiding its reflected beam to a photodetector. The optical system includes an objective lens disposed so as to face the optical disc. It is necessary for the objective lens used in the optical pickup unit to accurately control in position with respect to a focus direction along an optical axis and a track direction along a radial direction of the optical disc to thereby accurately focus the laser beam on a track of a recording surface of the rotating optical disc. These controls are called a focusing control and a tracking control, respectively. Further, following improvement in recording density, there have recently been increasing demands for removing or suppressing the influence caused by warping of the optical disc. In view of this, it is also necessary that the objective lens be subjected to a so-called tilting control.

The above-mentioned optical pickup actuator is a device for enabling the focusing control, the tracking control, and the tilting control. The optical pickup actuator is called an objective lens driving device. In the objective lens driving device, an objective lens holder holding the objective lens is elastically supported by a suspension member with respect to a damper base. The suspension member consists of a plurality of suspension wires disposed both sides of the damper base and the objective lens holder.

Now, the objective lens driving devices are classified into a so-called symmetry type and a so-called asymmetry type. The objective lens driving devices of the symmetry type are ones wherein coils and a magnetic circuit including magnets are symmetrically disposed with respect to the objective lens as a center. The objective lens driving devices of the asymmetry type are ones wherein the coils and the magnetic circuit including magnets are asymmetrically disposed with respect to the objective lens.

One of the objective lens driving devices of the symmetry type is disclosed, for example, in Japanese Unexamined Patent Application Publication No. 2001-93177 or JP-A 2001-93177. According to the JP-A 2001-93177, the objective lens driving device of the symmetry type comprises an objective lens holder for holding an objective lens, a focusing coil wound around the objective lens holder, tracking coils affixed to the objective lens holder at outer sides in a tangential direction of an optical disc, and tilting coils affixed to the objective lens holder at both sides in a radial direction of the optical disc. These coils are partly located in gaps of the magnetic circuit. With this structure, the objective lens driving device of the symmetry type is capable of finely controlling a position and an inclination of the objective lens by controlling currents flowing through the respective coils. In addition, inasmuch as it is necessary to affix the tracking coils and the tilting coils to the sides of the objective lens holder, each of the tracking coils and the tilting coils comprises an air-core coil.

However, the conventional objective lens driving device of the symmetry type, as disclosed in the JP-A 2001-93177, is disadvantageous in that it takes a deal of time to manufacturing the objective lens driving device and it increases in cost. This is because it is necessary to affix the tracking coils and the tilting coils to the sides of the objective lens holder. In addition, the objective lens driving device is expensive because the air-core coil is very expensive compared with a winding coil. Furthermore, inasmuch as the conventional objective lens driving device of the symmetry type has a structure where the focusing coil is wound around the objective lens holder, the laser beam must be passed through under an lower surface of the objective lens holder and it is therefore difficult to thin the optical pickup unit.

On the other hand, one of the objective lens driving device of the asymmetry type is disclosed, for example, in Japanese Unexamined Patent Application Publication No. 2001-273656 or JP-A 2001-273656. According to the JP-A 2001-273656, the objective lens driving device comprises coils printed on a printed board. By using the objective lens driving device of the asymmetry type, it is possible to expect to miniaturize (thin) the optical pickup unit.

However, the conventional objective lens driving device of the asymmetry type, as disclosed in the JP-A 2001-273656, is disadvantageous in that it is difficult to keep weight balance due to its asymmetry structure and undesired resonance such as rolling, pitching, or yawing of the object lens easily occurs on mass production. In addition, the conventional objective lens driving device of the asymmetry type is disadvantageous in that the coils printed on the printed board are expensive compared with winding coils. This is because a manufacturing process for printing the coils on the printed board is complicated. And, the conventional objective lens driving device of the asymmetry type comprises magnets magnetized in a manner of complicated multiple-poles. Therefore, the conventional objective lens driving device of the asymmetry type is expensive. By using such magnets, degradation of acceleration sensitivity, deterioration of a tilt characteristic, and so on are caused due to a neutral zone.

SUMMARY OF THE INVENTION

It is therefore an object of the present invention to provide an objective lens holder having a new structure which is capable of thinning an optical pickup unit in spite of an objective lens driving device of a symmetry type.

It is another object of the present invention to provide an objective lens driving device which is capable of easily assembling and of manufacturing at low cost.

Other objects of this invention will become clear as the description proceeds.

On describing the gist of this invention, it is possible to be understood that an objective lens holder is for holding an objective lens. The objective lens holder is for use in an objective lens driving device of a symmetry type. The objective lens holder comprises an upper member and a lower member assembled with said upper member. According to an aspect of this invention, the lower member comprises a pair of main bobbin portions for winding two tilting coils and two focusing coils. The pair of main bobbin portion is symmetrically disposed with respect to an optical axis of a laser beam. The upper member and the lower member have openings for passing through the laser beam.

Each of the upper member and the lower member has four hook portions for winding four tracking coils.

In the afore-mentioned objective lens holder, the objective lens holder further may comprise two first connection terminals for connecting end portions of the two focusing coils, two second connection terminals for connecting end portions of the four tracking coils, and two third connection terminals for connecting end portions of the two tilting coils. The two first connection terminals preferably may be disposed in the upper member at both side surfaces. The two second connection terminals preferably may be disposed in the lower member at both side surfaces. The two third connection terminals preferably may be disposed in the lower member at a lower surface. Desirably, the objective lens holder further may comprise two supporting portions disposed in the upper member at both sides in a tracking direction. Thereby, four suspension wires and two lead wires are fixed to the two supporting portions so as to penetrate the two supporting portions. The two first connection terminals and the two second connection terminals may be for connecting tip portions of the four suspension wires. The two third connection terminals may be for connecting tip portions of said two lead wires.

On describing the gist of this invention, it is possible to be understood that an objective lens driving device of a symmetry type comprises an objective lens and an objective lens holder for holding the objective lens. According to an aspect of this invention, the objective lens holder comprises an upper member and a lower member which are assembled with each other. The lower member has a pair of main bobbin portions symmetrically disposed with respect to an optical axis of a laser beam. The upper member and the lower member have openings for passing through the laser beam. Each of the upper member and the lower member has four hook portions. The objective lens driving device further comprises two tilting coils wound around the pair of main bobbin portions, two focusing coils wound around the pair of main bobbin portions so as to overlay the two tilting coils, four tracking coils wound around the four hook portions, a damper base apart from the objective lens holder in a tangential direction, and a suspension member elastically supporting the objective lens holder with respect to the damper base. The suspension member consists of a plurality of suspension wires disposed on both sides of the damper base and the objective lens holder. The objective lens driving device further comprises a magnetic circuit for applying driving forces to the two tilting coils, the two focusing coils, and the four tracking coils according to energizing to the two tilting coils, the two focusing coils, and the four tracking coils.

In the afore-mentioned objective lens driving device, the magnetic circuit may comprise a yoke and four magnets which are disposed along the tangential direction opposite to each other and which are apart from each other in a tracking direction so as to sandwich the objective lens holder in them. Each of the four magnets comprises a double pole magnetized magnet. The yoke may comprise a first rising portion opposed to and apart from two of the four tracking coils, a second rising portion opposed to and apart from remaining two of the four tracking coils, and two third rising portions, disposed between the first rising portion and the second rising portion, for passing through the pair of main bobbin portions. Two ones of the four magnets are mounted on an inner surface of the first rising portion so as to face the two of the four tacking coils. Remaining two ones of the four magnets are mounted on an inner surface of the second rising portion so as to face the remaining two of the four tracking coils. The second rising portion may has an opening for ensuring an optical path of the laser beam. The yoke further may comprise an extending portion for extending in the tangential direction from a central portion of the first rising portion to cover an upper surface of the damper base.

In the afore-mentioned objective lens driving device, the objective lens driving device further may comprise two first connection terminals for connecting end portions of the two focusing coils, two second connection terminals for connecting end portions to the four tracking coils, and two third connection terminals for connecting end portions of the two tilting coils. The two first connection terminals may be disposed in both side surfaces of the objective lens holder. The two second connection terminals may be disposed in the both side surfaces of the objective lens holder. The two third connection terminals may be disposed in a lower surface of the objective lens holder. The objective lend holder may comprise two supporting portions, disposed at both sides in a tracking direction, for supporting the suspension member. The suspension member may consist of four suspension wires. In this event, the four suspension wires may penetrate the two supporting portions and may be fixed to the two supporting portions. One pair of the four suspension wires has tip portions which are electrically connected to the two first connection terminals. Another pair of the four suspension wires has tip portions which are electrically connected to the two second connection terminals. The objective lens driving device further may comprise two lead wires disposed between the damper base and the objective lens holder. In this event, the two lead wires may penetrate the two supporting potions and may be fixed to the two supporting portions. The two lead wires has tip portions which are bent downwards to be electrically connected to the two third connection terminals.

DESCRIPTION OF THE PREFERRED EMBODIMENT

The present inventor studied what kind of an objective lens holder is adopted in order not only to thin an optical pickup unit in spite of an objective lens driving device of a symmetry type and but also to provide an objective lens driving device which is capable of easily assembling and of manufacturing at low cost. At first, in order to easily assemble and manufacture at low cost, the present inventor adopted the objective lens holder having a structure where the objective lens holder is divided into two members and the objective lens holder comprises a bobbin portion enable to using winding coils as tracking coils and tilting coils. On the other hand, in order to thin the optical pickup unit, the present inventor adopted the objective lens holder having a structure where two focusing coils are symmetrically wound around the objective lens driving holder with respect to an optical axis of a laser beam without winding one focusing coil in the objective lens holder. And, the present inventor adopted the objective lens holder having an opening for passing through the laser beam. Therefore, it is possible to thin the optical pickup unit by passing the laser beam through the opening in the objective lens holder without passing through the laser beam under a lower surface of the objective lens holder.

Figure 1:
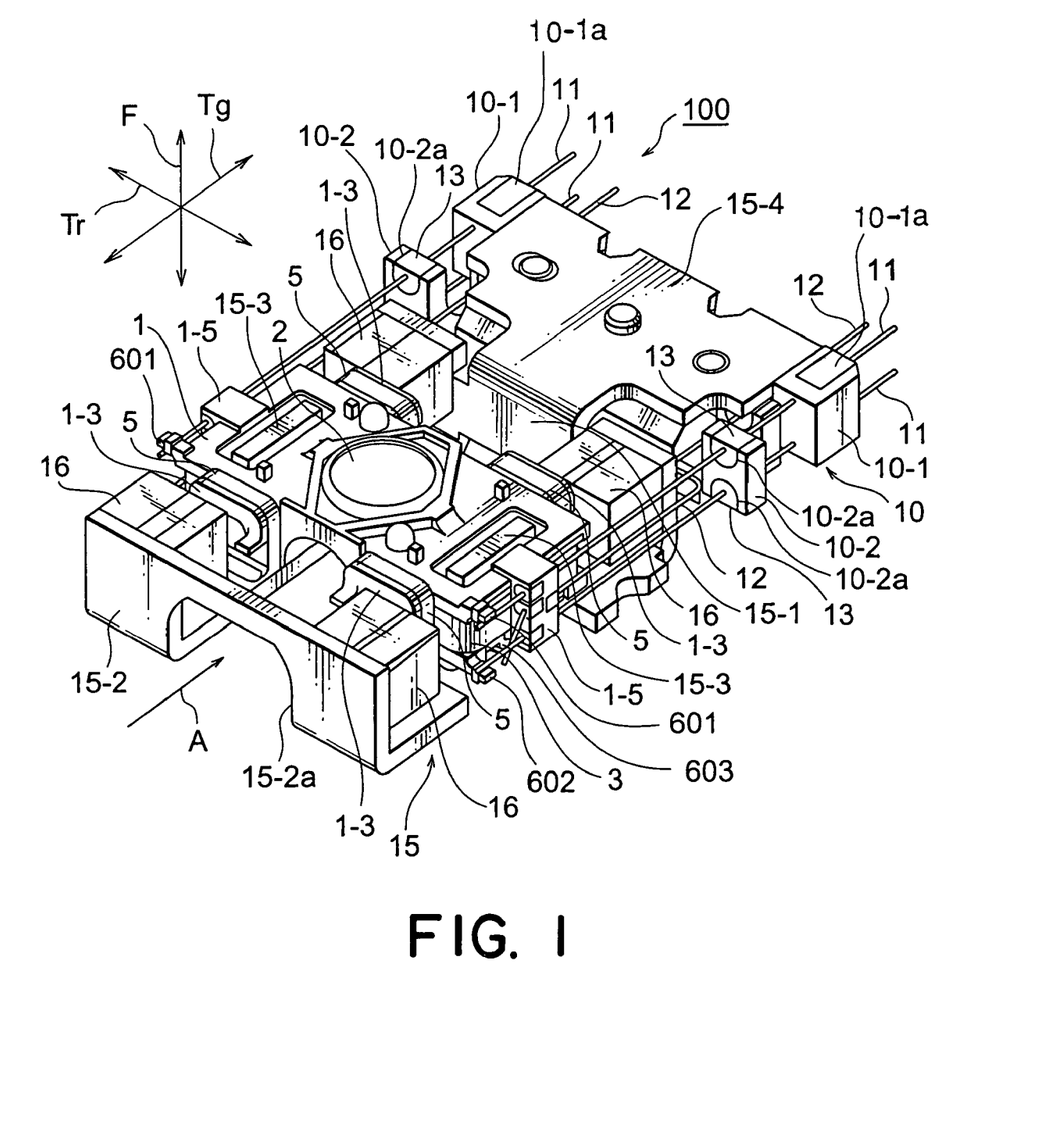
FIG. 1 is a perspective view of an objective lens driving device according to an embodiment of this invention.

FIG. 1 is a perspective view of an objective lens driving device 100 according to an embodiment of this invention. The illustrated objective lens driving device 100 is shown in a state where a metallic top cover (not shown) is removed from it.

As shown in FIG. 1, the objective lens driving device 100 comprises an objective lens holder 1. The objective lens holder 1 has a lens fitting portion (which will later be described) for fitting an objective lens 2 at a center thereof. The lens fitting portion has a through hole. The objective lens holder 1 comprises a pair of main bobbin portions (which will later be described) for wining two tilting coils (which will later be described) and two focusing coils 3 at both sides of the lens fitting portion in a tracking direction Tr.

Each main bobbin portion has an opening for exposing a part (which will later be described) of a yoke. The objective lens holder 1 has four outer walls. The objective lens holder 1 comprises four sub bobbin portions 1-3 for winding four tracking coils 5 at two outer walls in parallel in the tracking direction Tr or a width direction in positions corresponding to the above-mentioned main bobbin portions, respectively.

In the example being illustrated, the objective lens holder 1 is elastically supported through four suspension wires 11 by a damper base 10. The damper base 10 is apart from the object lens holder 1 in a tangential direction Tg. Specifically, the damper base 10 has two supporting portions 10-1 at two side walls in parallel in the tangential direction Tg. Each of the two supporting portions 10-1 is for supporting ends of the corresponding two suspension wires 11. An end of each suspension wire 11 penetrates the corresponding supporting portion 10-1 and is adhesively fixed at a concave portion 10-1*a*.

Concave portions 10-1*a* are formed in the supporting portion 10-1 at upper and lower surfaces thereof. At inner sides of the supporting portions 10-1, ends of two lead wires 12 are attached to the damper base 10. The damper base 10 has two damper portions 10-2 apart from the supporting portions 10-1 in the tangential direction Tg toward the objective lens holder 1. Each of the two damper portions 10-2 has two U-shaped ditches 10-2*a* at both sides in a focusing direction F. In the ditches 10-2*a*, damping material 13 such as silicone gel is filled.

On the other hand, at two side walls in parallel in the tangential direction Tg, the objective lens holder 1 has two supporting portions 1-5 each of which is for supporting other ends of the two suspension wires 11 and another end of the lead wire 12. The other ends of each suspension wire 11 and the lead wire 12 penetrate and are adhesively fixed to the corresponding supporting portion 1-5 in a penetrated state.

At any rate, in the example being illustrated, a suspension member consists of the four suspension wires 11 disposed on both sides of the damper base 10 and the objective lens holder 1. The suspension member elastically supports the objective lens holder 1 with respect to the damper base.

In the manner which is well known in the art, the four suspension wires 11 and the two lead wires 12 are also used as wires for electrically connecting the above-mentioned various coils with an external circuit, namely, a driving circuit for driving the objective lens driving device 100.

At a lower side of the objective lens holder 1, an assembled member consisting of a yoke 15 and four magnets 16 are disposed. The assembled member forms a magnetic circuit among the above-mentioned various coils. The magnetic circuit applies driving forces to the two tilting coils, the two focusing coils 3, and the four tracking coils 5 according to energizing to the two tilting coils, the two focusing coils 3, and the four tracking coils 5.

In the example being illustrated, the yoke 15 comprises a first rising portion (a first wall member) 15-1 and a second rising portion (a second wall member) 15-2. The first rising portion 15-1 is opposed to and apart from two of the four tracking coils 5 that are wound around the two sub bobbin portions 1-3 formed in one side wall of the objective lens holder 1. The second rising portion 15-2 is opposed to and apart from remaining two of the four tracking coils 5 that are wound around the two sub bobbin portions 1-3 formed in another side wall of the objective lens holder 1. The yoke 14 further comprises two third rising portions (yoke pieces) 15-3 between the first rising portion 15-1 and the second rising portion 15-2. The two third riding portions 15-3 pass through the main bobbin portions of the objective lens holder 1. The second riding portion 15-2 has an opening 15-2*a* for ensuring an optical path of a laser beam for the objective lens 2 fitted in the objective lens holder 1 as shown in an arrow A.

The yoke 15 comprises an extending portion 15-4 for extending in the tangential direction Tg from at a central portion of the first rising portion 15-1 to cover an upper surface of the damper base 10.

At any rate, such a yoke 15 is made of a plate member and the first through the third rising portions 15-1 to 15-4 and the extending portion 15-4 are formed by bending from a rectangular bottom portion (main portion).

Two ones of the four magnets 16 are mounted on an inner surface of the first rising portion 15-1 so as to face the two of the four tracking coils 5.

Remaining two ones of the four magnets 16 are mounted on an inner surface of the second rising portion 15-2 so as to face the remaining two of the four tracking coils 5.

At any rate, the four magnets 16 are disposed along the tangential direction Tg opposite to each other and apart from each other in the tracking direction Tr so as to sandwich the objective lens holder 1 in them.

Figure 2:
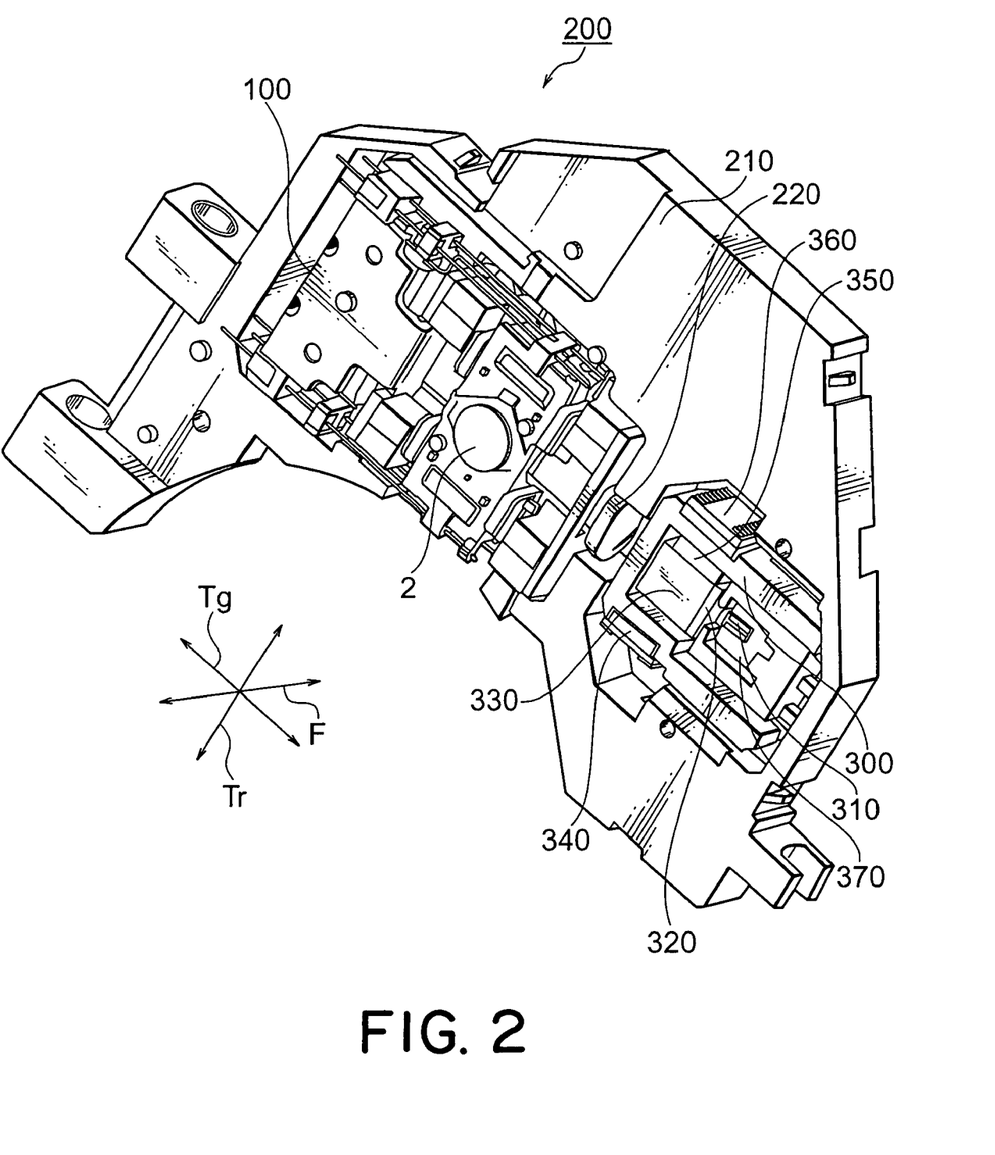
FIG. 2 is a perspective view of an optical pickup unit including the objective lens driving device illustrated in FIG. 1 seen from a top surface side.
Figure 3:
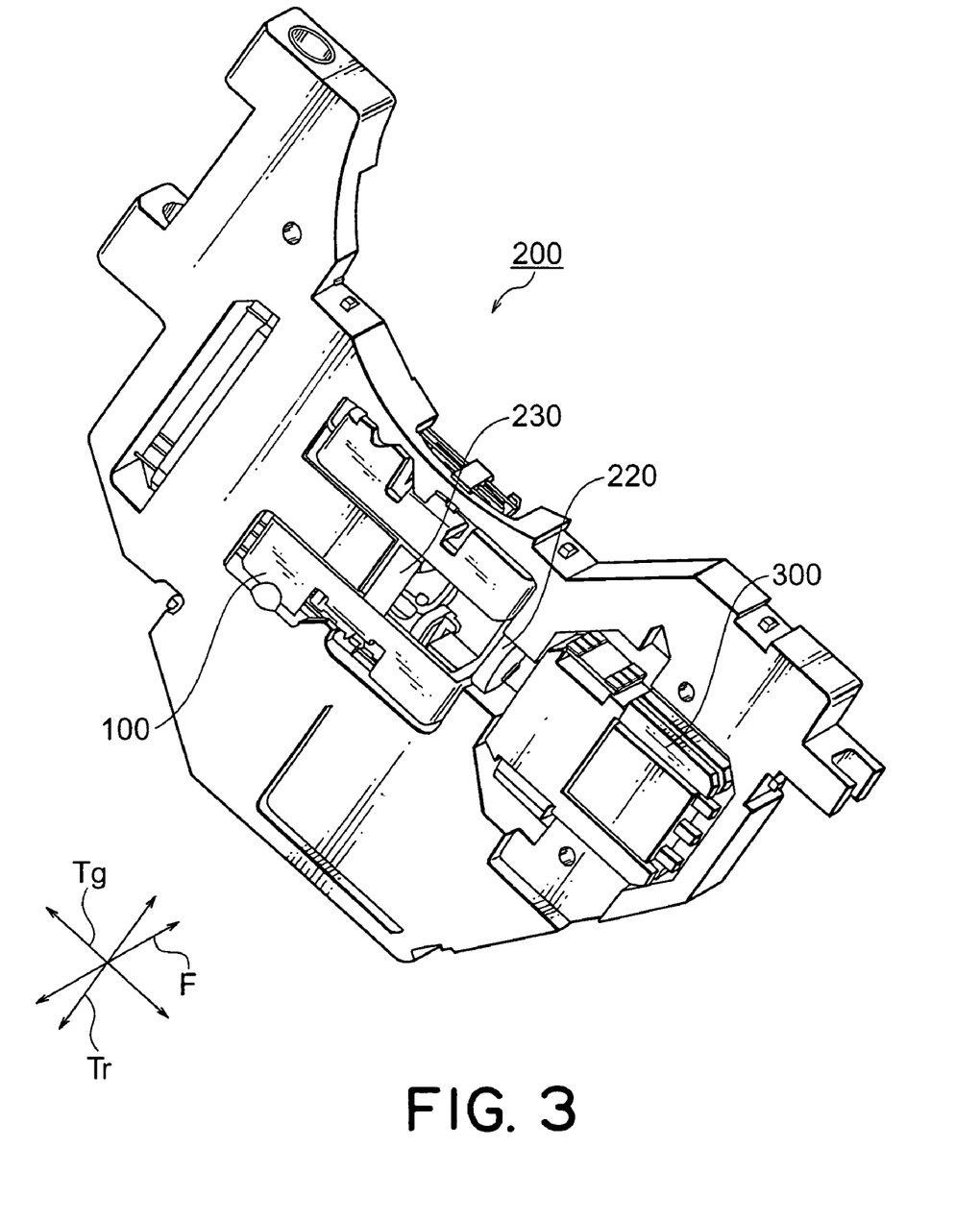
FIG. 3 is a perspective view of the optical pickup unit illustrated in FIG. 2 seen from a bottom surface side.

FIGS. 2 and 3 are views showing an optical pickup unit 200 including the objective lens driving device 100 illustrated in FIG. 1. FIG. 2 is a perspective view of the optical pickup unit 200 seen from a top surface side. FIG. 3 is a perspective view of the optical pickup unit 200 seen from a bottom surface side.

The illustrated optical pickup unit 200 is a two-wavelength handling type.

The optical pickup unit 200 comprises an optical base 210 on which the objective lens driving device 100 is mounted. The optical base 210 is movably mounted to guide bars (not shown) along a radial direction (the tracking direction Tr) of an optical disc loaded in an optical disc drive. In the optical base 210, a laser diode, a photodetector, and a predetermined optical system are mounted in the manner which will later be described. In the optical pickup unit 200, a laser beam from the laser diode is irradiated on an optical disc through the objective lens 2 and its reflected beam is guided to the photodetector.

The illustrated optical pickup unit 200 comprises a light receiving/emitting packaged type module 300 mounted on the optical base 210.

The light receiving/emitting packaged type module 300 comprises a laser emitting element 310, an optical axis correcting element 320, a polarization beam splitter 330, a front monitor 340, a sensor lens 350, and the photodetector 360. The laser emitting element 310 is mounted on a metallic frame 370.

The laser emitting element 310 comprises a one-chip type laser diode comprising, as one part (one chip), a first laser diode and a second laser diode.

The optical axis correcting element 320 is for coinciding an optical axis of a first laser beam emitted from the first laser diode with another optical axis of a second laser beam emitted from the second laser diode.

The first laser diode is a laser diode for emitting the first laser beam having, as a first wavelength, a wavelength of 650 nm for a DVD. The second laser diode is a laser diode for emitting the second laser beam having, as a second wavelength, a wavelength of 780 nm for a CD.

Between the light receiving/emitting packaged type module 300 and the objective lens driving device 100, a collimator lens 220 is mounted in the optical base 210. Under the objective lens 2, a total reflection mirror (a rising mirror) 230 is attached to the optical base 210.

In the objective lens holder 1, the tilting coils, the focusing coils 3, and the tracking coils 5 are wound in the manner which will later be described. By suitably controlling currents flowing through these coils, the objective lens holder 1 tilts in the tracking direction Tr (rotates around an axis in parallel to the tangential direction Tg), shifts in the tracking direction Tr, or shifts in the focusing direction F on the basis of relationships between the currents and magnetic fields produced by the yoke 15 and the magnets 16.

Now, the description will proceed to operation of the two-wavelength handling optical pickup unit 200 illustrated in FIGS. 2 and 3. First, the description will be made as regards operation in a case where the DVD is used as the optical disc.

Subsequently, the description will later be made as regards operation in a case where the CD is used as the optical disc.

When the optical disc is the DVD, only the first laser diode is put into an active state while the second laser diode is put into an inactive state.

Accordingly, only the first laser diode emits the first laser beam.

Emitted from the first laser diode for the DVD, the first laser beam passes through the optical axis correcting element 320 at which the optical axis of the first laser beam is corrected. The corrected first laser beam enters the polarization beam splitter 330. Almost of the corrected first laser beam transmits through the polarization beam splitter 330 while a part of the corrected first laser beam is reflected by the polarization beam splitter 330. Reflected by the polarization beam splitter 330, the laser beam is monitored by the front monitor 340. Transmitted through the polarization beam splitter 330, the laser beam is collimated by the collimator lens 220 into a collimated beam which enters in the objective lens 2 through the total reflection mirror 230.

Transmitted through the objective lens 2, the laser beam is converged therein and is irradiated (concentrated) on a recording surface of the DVD as the optical disc.

In the manner which is well known in the art, the two-wavelength handling optical pickup unit is operable at a writing mode or a reproducing mode. When the two-wavelength handling optical pickup unit operates at the writing mode, operation thereof comes to end in the above-description. On the other hand, when the two-wavelength handling optical pickup unit operates at the reproducing mode, the following operation proceeds.

Reflected from the recording surface of the optical disc (DVD), a first return beam passes through the objective lens 2, is reflected by the total reflection mirror 230, and transmits through the collimator lens 220 to obtain a converged beam. The converged beam is reflected by the polarization beam splitter 330, transmits the sensor lens 350, and then is concentrated (received) in the photodetector 360.

Subsequently, when the optical disc is the CD, only the second laser diode is an active state while the first laser diode is an inactive state.

Accordingly, only the second laser diode emits the second laser beam.

Emitted from the second laser diode for the CD, the second laser beam passes through the optical axis correcting element 320 at which the optical axis of the second laser beam is corrected. Operation after this is similar to the above-mentioned case where the optical disc is the DVD. Specifically, the corrected second laser beam enters the polarization beam splitter 330. Almost of the corrected second laser beam transmits through the polarization beam splitter 330 while a part of the corrected second laser beam is reflected by the polarization beam splitter 330. Reflected by the polarization beam splitter 330, the laser beam is monitored by the front monitor 340. Transmitted through the polarization beam splitter 330, the laser beam is collimated by the collimator lens 220 into a collimated beam which enters the objective lens 2 through the total reflection mirror 230. Transmitted through the objective lens 2, the laser beam is converged therein and is irradiated (concentrated) on a recording surface of the CD as the optical disc.

Reflected from the recording surface of the optical disc (CD), a second return beam passes through the objective lens 2, is reflected by the total reflection mirror 230, and transmits through the collimator lens 220 to obtain a converged beam. The converged beam is reflected by the polarization beam splitter 330, transmits the sensor lens 350, and then is concentrated (received) in the photodetector 360.

Figure 4A:
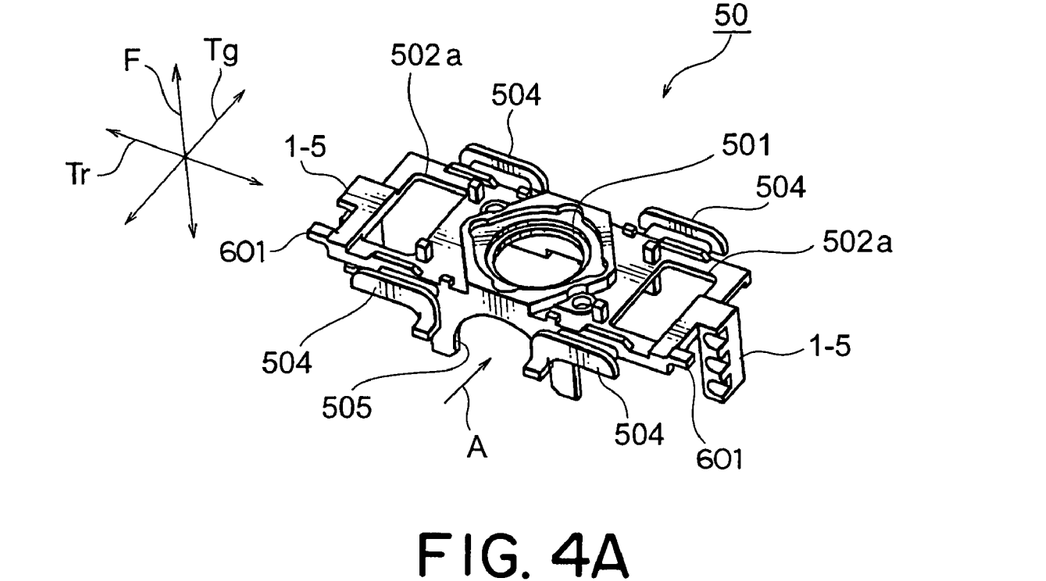
FIG. 4A is a perspective view of an upper member of an objective lens holder for use in the objective lens driving device illustrated in FIG. 1.
Figure 4B:
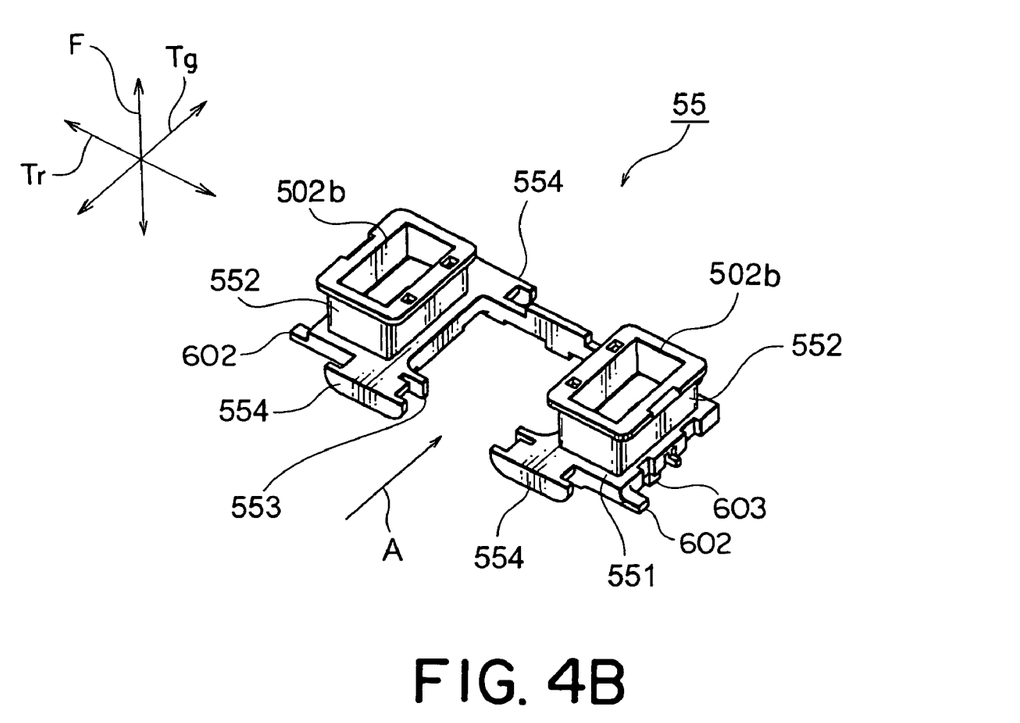
FIG. 4B is a perspective view of a lower member of the objective lens holder for use in the objective lens driving device illustrated in FIG. 1.

Referring to FIGS. 4A and 4B, the description will proceed to the objective lens holder 1 in more detail. The objective lens holder 1 comprises an upper member 50 as shown in FIG. 4A and a lower member 55 as shown in FIG. 4B.

As shown in FIG. 4A, the upper member 50 has a substantially rectangular shape or a substantially rectangular surface which faces the lower member 55. The upper member 50 has the lens fitting portion 501 for fitting the objective lens 2. The lens fitting portion 501 has the through hole. At both sides in the tracking direction Tr with the lens fitting portion 501 sandwiched, the upper member 50 has two rectangular holes 502a for inserting the part of the yoke 15 (the third rising portion 15-3) at symmetrical positions.

The upper member 50 is provided with the two supporting portions 1-5 at the both sides in the tracking direction Tr. The two supporting portions 1-5 are for supporting the other ends of the four suspension wires 11 and the two lead wires 12. The upper member 50 has four first hook portions 504 for winding the four tracking coils 5 at the both side in the tangential direction Tg adjacent to end portions thereof. The four first hook portions 504 are formed so as to project along the tangential direction Tg. The upper member 50 has a notch (an opening) 505 for ensuring the optical path A of the laser beam.

On the other hand, the lower member 55 comprises a substantially U-shaped plate portion 551 as shown in FIG. 4B. The substantially U-shaped plate portion 551 has a symmetry shape with respect to the optical path A of the laser beam as a center. The substantially U-shaped plate portion 551 has a main surface from which the two main bobbin portions 552 project in a vertical direction or the focusing direction F. The plate portion 552 has a size which is similar to the upper member 50 with respect to at least the tangential direction Tg.

The plate portion 551 has two rectangular holes 502b for inserting the part of the yoke 15 (the third rising portions 15-3) at both end portions thereof. The main bobbin portions 552 are formed so as to enclose the respective rectangular holes 502b. The lower member 55 has a notch (an opening) 553 for ensuring the optical path A of the laser beam.

Furthermore, the lower member 55 has four second hook portions 554 (only three ones are illustrated in FIG. 4B) for winding the four tracking coils 5 at the both side in the tangential direction Tg adjacent to end portions thereof. The four second hook portions 554 are formed so as to project along the tangential direction Tg.

A combination of the first hook portion 504 and the second hook portion 564 serves as the sub bobbin portion 1-3 for winding the tracking coil 5.

Although the upper member 50 and the lower member 55 constitute the objective lens holder 1 as they are assembled with each other, the tilting coils and the focusing coils are wound around the main bobbin portions 552 in this order before assembling them with each other.

Referring now to FIGS. 5 through 9, the description will proceed to process for assembling a movable portion of the objective lens driving device by winding the coils around the objective lens holder 1.

Figure 5:
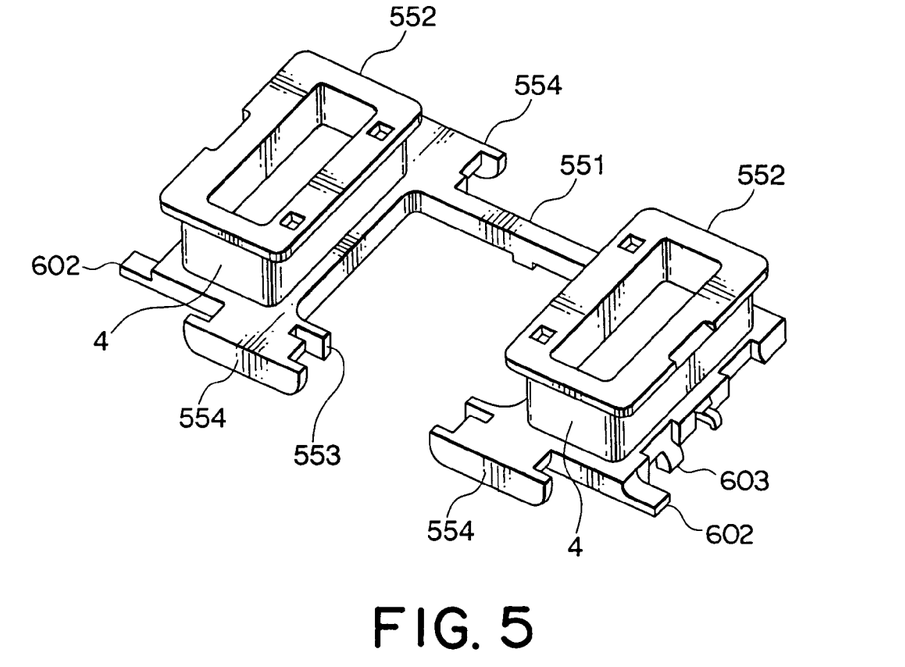
FIG. 5 is a perspective view of a state where two tilting coils are wound around the lower member illustrated in FIG. 4B.
Figure 6:
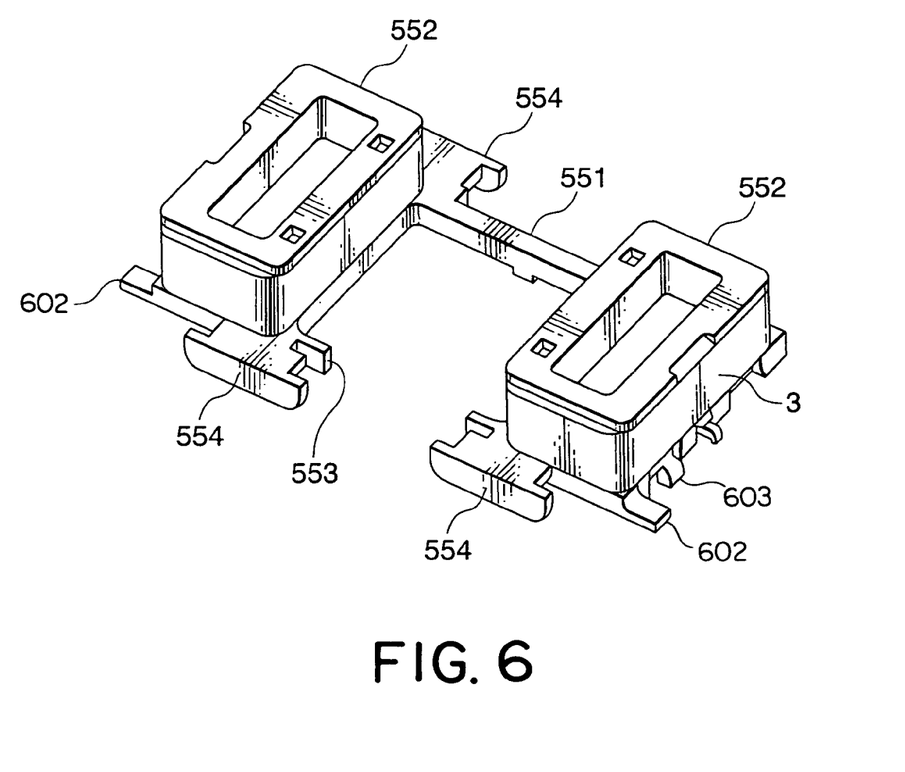
FIG. 6 is a perspective view of a state where two focusing coils are wound around the lower member in a state shown in FIG. 5.

At first, as shown in FIG. 5, two tilting coils 4 are wound around the two main bobbin portions 552 in order, respectively. Thereafter, as shown in FIG. 6, the two focusing coils 3 are wound around the two main bobbin portions 552 around which the two tilting coils 4 are wound so as to overlay the two tilting coils 4.

After the two tilting coils 4 and the two focusing coils 4 are wound in the lower member 55 in the manner which is described above, the upper member 50 is mounted to the lower member 55. This state is shown in FIG. 7.

Figure 7:
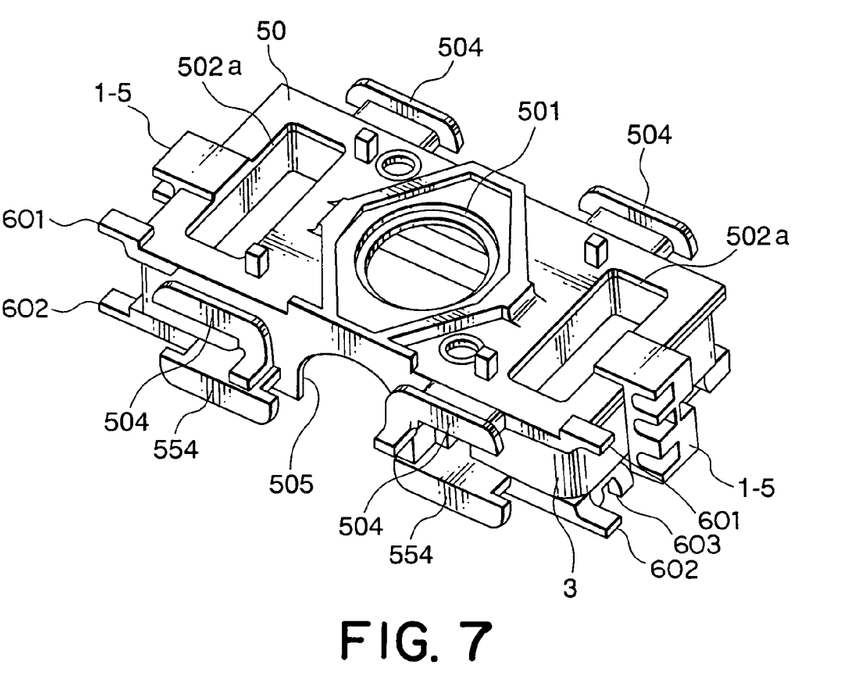
FIG. 7 is a perspective view of the objective lens holder where the upper member illustrated in FIG. 4A is mounted in the lower member in a state shown in FIG. 6.

In the state shown in FIG. 7, a central axis of the through hole (the lens fitting portion) 501 formed in the upper member 50 and a central axis of the notch (opening) 553 formed in the under member 55 coincide with each other. In addition, the four first hook portions 504 formed in the upper member 50 and the four second hook portions 664 formed in the lower member 55 are opposite to each other to form pairs, respectively. The four pairs of the first hook portion 504 and the second hook portion 554 constitute the four sub bobbin portions 1-3 for winding the four tracking coils 5, respectively, in the manner which is described above.

Figure 8:
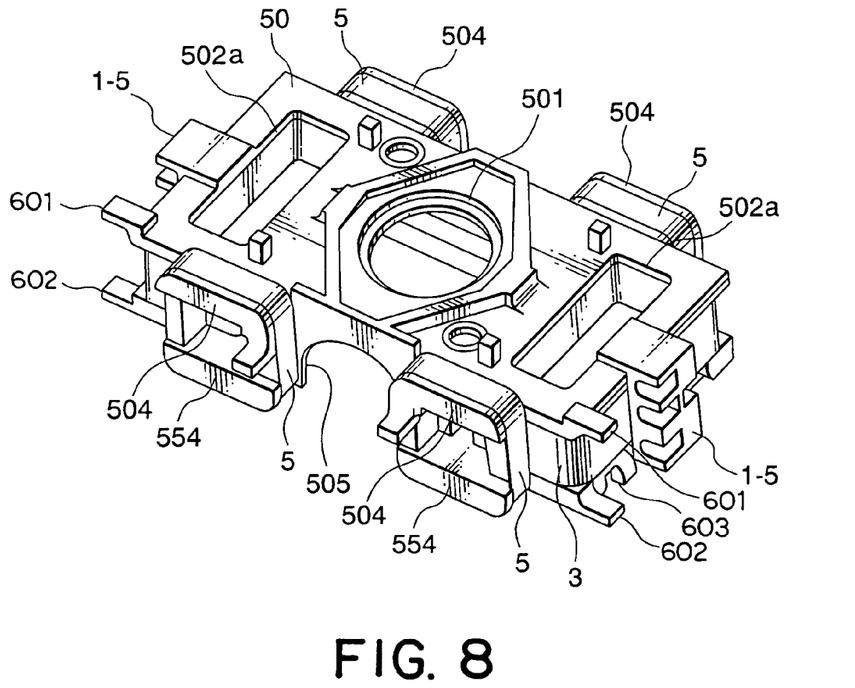
FIG. 8 is a perspective view showing a state where four tracking coils are wound around the objective lens holder in a state shown in FIG. 7.
Figure 9:
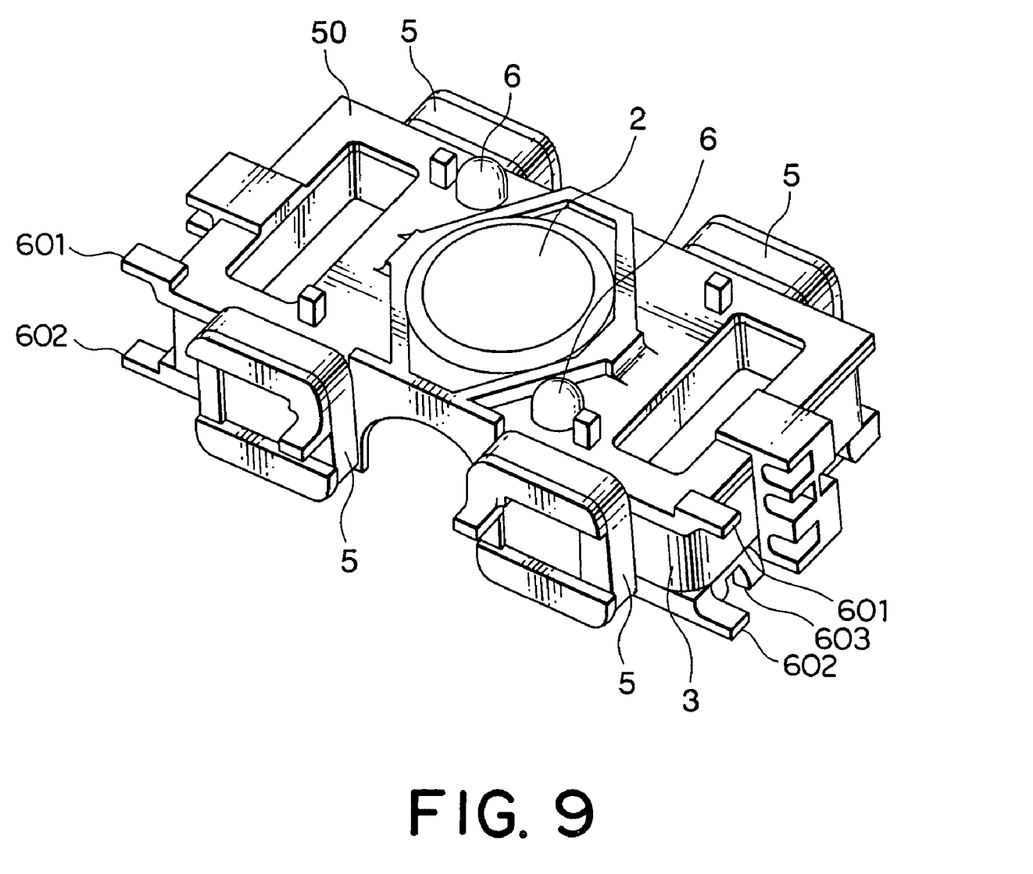
FIG. 9 is a perspective view showing a state where an objective lens and two disc protectors are mounted on the objective lens holder in a state shown in FIG. 8.

Subsequently, the four tracking coils 5 are wound around the four sub bobbin portions 103 as shown in FIG. 8 and then the objective lens 2 and two disc protectors 6 are mounted on the upper member 50 by adhering as shown in FIG. 9.

Turning back to FIG. 1, two end portions of the two focusing coils 3 are connected to two first connection terminals 601, two end portions of the four tracking coils 5 are connected to two second connection terminals 602, and two end portions of the two tilting coils 4 are connected to two third connection terminals 603. The two first connection portions 601 are disposed in the upper member 50 at both side surfaces. The two second connection portions 602 are disposed in the lower member 55 at both side surfaces. The two third connection portions 603 are disposed in the lower member 55 at a lower surface.

Connected to the end portions of the two focusing coils 3, the two first connection terminals 601 are electrically connected to tip portions of one pair of the four suspension wires 11. Connected to the end portions of the four tracking coils 4, the two second connection terminals 602 are electrically connected to tip portions of another pair of the four suspension wires 11. The four suspension wires 11 are fixed to the two supporting portions 1-5 formed in the upper member 50 so as to penetrate the two supporting portions 1-5.

Connected to the end portions of the four tilting coils 4, the two third connection terminals 603 are electrically connected to tip portions of the two lead terminals 12.

As shown in FIG. 1, after the two lead wires 12 penetrate and are fixed to the two supporting portions 1-5, the tip portions of the two lead wires 12 are bent downwards to be electrically connected to the two third connection terminals 603 for the two tilting coils 4.

FIG. 1 is the perspective view of the objective lens driving device 100 showing a state where the yoke 15 and the four magnets 16 are assembled to the objective lens holder 1 in which the coils 3, 4, and 5 are wound and the suspension wires 11 are attached. Each of the four magnets 16 is a double pole magnetized magnet.

In the manner which is easily understood from FIG. 1, the two tilting coils 4, the two focusing coils 3, and the four tracking coils 5 are partially located in magnetic gaps of the magnetic circuit comprising a combination of the yoke 15 and the four magnets 16. Accordingly, the objective lens holder 1 moves or tilts in accordance with currents flowing through the coils 3, 4, and 5. That is, it is possible to carry out the tilting control, the focusing control, and the tracking control by controlling the currents flowing through the coils 3, 4, and 5. In other words, the objective lens driving device 100 of the symmetry type is capable of finely controlling a position and an inclination of the objective lens 2 by controlling the currents flowing through the respective coils 3, 4, and 5.

With this structure, it is possible to miniaturize the objective lens holder 1 because a space for exclusive tilting coils are not required. As a result, it is possible to realize miniaturization of the objective lens driving device 100. Inasmuch as the objective lens holder 1 is divided into the upper member 50 and the lower member 55 and winding coils are used as the tracking coils 5 and the tilting coils 4, it is possible to provide the objective lens driving device 100 which is easily assembles and which is manufactured at low cost. The objective lens holder 1 has a structure where the two focusing coils 3 are symmetrically wound around the objective lens holder 1 with respect to the optical axis of the laser beam without winding one focusing coil in the objective lens holder and the objective lens holder 1 has the openings 505 and 553 for passing through the laser beam. Therefore, it is possible to thin the optical pickup unit 200 by passing the laser beam through the openings 505 and 553 in the objective lens holder 1 without passing through the laser beam under a lower surface of the objective lens holder.

While this invention has thus far been described in conjunction with a preferred embodiment thereof, it will now be readily possible for those skilled in the art to put this invention into various other manners without departing from the scope of this invention. For example, the optical pickup unit according to this invention may be best suitable to optical disc drives, particularly, to thin-type optical disc drives and may be applicable to all of optical disc drives for reading recorded information or for writing information from/to optical discs (CD, CD-ROM, CD-R, CD-RW, DVD-ROM, DVD+R, DVD–R, DVD-RAM, DVD+RW, DVD–RW, or the like). Needless to say, this invention is not restricted to the two-wavelength handling optical pickup units, this invention may be applicable to one-wavelength handling optical pickup units.

What is claimed is:

1. An objective lens holder for holding an objective lens, said objective lens holder being for use in an objective lens driving device of a symmetry type, said objective lens holder comprising:
   an upper member; and
   a lower member assembled with said upper member;
   wherein said upper member and said lower member have openings for passing a laser beam through;
   wherein said lower member comprises a pair of main bobbin portions for winding two tilting coils and two focusing coils, and said main bobbin portions are symmetrically disposed with respect to an optical axis of said laser beam; and
   wherein each of said upper member and said lower member has four hook portions for winding four tracking coils.

2. The objective lens holder as claimed in claim 1, further comprising:
   two first connection terminals for connecting to end portions of said two focusing coils;
   two second connection terminals for connecting to end portions of said four tracking coils; and
   two third connection terminals for connecting to end portions of said two tilting coils.

3. The objective lens holder as claimed in claim 2, wherein said two first connection terminals are disposed at two side surfaces of said upper member, said two second connection terminals are disposed at side surfaces of said lower member, and said two third connection terminals are disposed at a lower surface of said lower member.

4. The objective lens holder as claimed in claim 2, further comprising two supporting portions disposed at two sides of said upper member in a tracking direction, wherein four suspension wires and two lead wires are fixed to said two supporting portions so as to penetrate said two supporting portions.

5. The objective lens holder as claimed in claim 4, wherein said two first connection terminals and said two second connection terminals are for connecting to tip portions of said four suspension wires, and said two third connection terminals are for connecting to tip portions of said two lead wires.

6. An objective lens driving device of a symmetry type comprising:
   an objective lens;
   an objective lens holder for holding said objective lens, said objective lens holder comprising an upper member and a lower member which are assembled with each other, said upper member and said lower member having openings for passing a laser beam through, said lower member having a pair of main bobbin portions symmetrically disposed with respect to an optical axis of said laser beam, and each of said upper member and said lower member having four hook portions;
   two tilting coils wound around said pair of main bobbin portions;
   two focusing coils wound around said pair of main bobbin portions so as to overlay said two tilting coils;
   four tracking coils wound around said four hook portions of each of said upper and lower members;
   a damper base apart from said objective lens holder in a tangential direction;
   a suspension member elastically supporting said objective lens holder with respect to said damper base, said suspension member consisting of a plurality of suspension wires disposed on both sides of said damper base and said objective lens holder; and
   a magnetic circuit for applying driving forces to said two tilting coils, said two focusing coils, and said four tracking coils according to energizing to said two tilting coils, said two focusing coils, and said four tracking coils.

7. The objective lens driving device as claimed in claim 6, wherein said magnetic circuit comprises:
   a yoke; and
   four magnets provided in pairs of two magnets disposed opposite to each other along the tangential direction so as to sandwich said objective lens holder between the two magnets, the pairs being apart from each other in a tracking direction, and each of said four magnets comprising a double pole magnetized magnet.

8. The objective lens driving device as claimed in claim 7, wherein said yoke comprises:
   a first rising portion opposed to and apart from two of said four tracking coils;
   a second rising portion opposed to and apart from the other two of said four tracking coils; and
   two third rising portions, disposed between said first rising portion and said second rising portion, for passing through said pair of main bobbin portions,
   wherein two said four magnets are mounted on an inner surface of said first rising portion so as to face the two of said four tracking coils, and the other two of said four magnets are mounted on an inner surface of said second rising portion so as to face the other two of said four tracking coils.

9. The objective lens driving device as claimed in claim 8, wherein said second rising portion has an opening for ensuring an optical path of said laser beam.

10. The objective lens driving device as claimed in claim 8, wherein said yoke further comprises an extending portion which extends in the tangential direction from a central portion of said first rising portion to cover an upper surface of said damper base.

11. The objective lens driving device as claimed in claim 6, further comprising:
   two first connection terminals for connecting to end portions of said two focusing coils, said two first connection terminals being disposed at two side surfaces of said objective lens holder;
   two second connection terminals for connecting to end portions of said four tracking coils, said two second connection terminals being disposed at said two side surfaces of said objective lens holder; and
   two third connection terminals for connecting to end portions of said two tilting coils, said two third connection terminals being disposed at a lower surface of said objective lens holder.

12. The objective lens driving device as claimed in claim 11, wherein said objective lens holder comprises two supporting portions, disposed at two sides of said objective lens holder in a tracking direction, for supporting said suspension member.

13. The objective lens driving device as claimed in claim 12, wherein said suspension member consists of four suspension wires, said four suspension wires penetrating said two supporting portions and being fixed to said two supporting portions, one pair of two of said four suspension wires having tip portions which are electrically connected to said two first connection terminals, and another pair of two of said four suspension wires having tip portions which are electrically connected to said two second connection terminals.

14. The objective lens driving device as claimed in claim 12, further comprising two lead wires disposed between said damper base and said objective lens holder, wherein said two lead wires penetrate said two supporting potions and are fixed to said two supporting portions, and said two lead wires have tip portions which are bent downwards to be electrically connected to said two third connection terminals.

* * * * *